United States Patent Office 3,751,448
Patented Aug. 7, 1973

3,751,448
BASICALLY SUBSTITUTED ISOBORNYL URETHANES
Georg Jager, Raunheim (Main), and Rolf Geiger and Roman Muschaweck, Frankfurt am Main, Germany, assignors to Farbwerke Hoechst Aktiengesellschaft vormals Meister Lucius & Bruning, Frankfurt am Main, Germany
No Drawing. Filed Jan. 19, 1972, Ser. No. 219,150
Claims priority, application Germany, Jan. 21, 1971, P 21 02 741.8; Dec. 4, 1971, P 21 60 237.9
Int. Cl. C07d 29/26
U.S. Cl. 260—482 C  4 Claims

ABSTRACT OF THE DISCLOSURE

Basically substituted isobornyl urethanes of the General Formula I

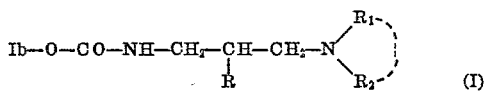

in which Ib represents the isobornyl radical, R represents hydrogen or the OH-group, $R_1$ and $R_2$ represent an alkyl radical having 1 to 4 carbon atoms or N, $R_1$, $R_2$ represent the pyrrolidino or piperidino radical and their salts with physiologically tolerated acids, having local anaesthetic action.

---

The present invention provides basically substituted isobornyl-urethanes of the General Formula I

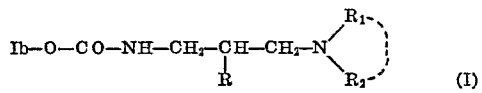

in which Ib represents the isobornyl radical, R represents hydrogen or the OH-group, $R_1$ and $R_2$ represent an alkyl radical having 1 to 4 carbon atoms or N, $R_1$, $R_2$ represent the pyrrolidino or piperidino radical.

These compounds are obtained by reacting chlorocarbonic acid isobornyl ester at a reaction temperature of 0° to 30° C. or an isobornyloxycarbonyl active ester with an amine of the General Formula II

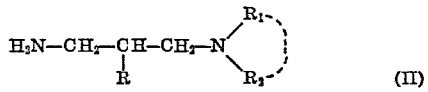

in which R and the group N, $R_1$, $R_2$ have the meanings given above.

Chlorocarbonic acid isobornyl ester is prepared from isoborneol and phosgene, advantageously in the presence of a tertiary base such as triethylamine, N,N-dimethylaniline or pyridine. The isobornyloxycarbonyl-active esters are accessible from chlorocarbonic acid isobornyl ester and the activating component in form of the corresponding OH-compound; as active esters there may be used, for example phenyl esters which may be substituted, for example nitro-phenyl-, trichloro-phenyl- or pentaphenyl esters as well as the esters described in peptide chemistry as being activating esters (cf. Schröder/Lübke, "The Peptides," vol. I (1965), pages 97–108). The reaction of the chlorocarbonic acid isobornyl ester with the amines of the General Formula II is carried out, for example at 0°–30° C., preferably at 15°–20° C., with a slight excess of chlorocarbonic acid isobornyl ester, because it can be easily removed when the reaction is completed than a base of the General Formula II. The isobornyloxycarbonyl active esters are reacted with the amines of the Formula II under similar conditions, but the reaction temperature may here be higher than 30° C.

As solvents, all organic solvents may be used which, under the reaction conditions, do not react with the chlorocarbonic acid insobornyl ester or to a negligeable extent only. Such solvents are, for example ether, dioxane, tetrahydrofurane, ethylene-glycol dimethyl ether, chloroform, benzene, dimethylformamide or dimethylacetamide. The two last-mentioned solvents react at temperatures below 30° C. so slowly with chlorocarbonic acid isobornyl ester that, owing to their favourable dissolving properties, they are particularly suited for the process of the invention.

The products are easy to isolate in the form of the hydrochlorides by adding, for example absolute ether to the reaction mixture and filtering off with suction the crystallized hydrochloride. The hydrochlorides, which are preferably used, can also be converted into the salts of other physiologically tolerated acids.

As inorganic acids there enter into consideration, for instance: hydrohalic acids such as hydrochloric acid and hydrobromic acid, furthermore sulfuric acid, phosphoric acid and amidosulfonic acid. As organic acids may be mentioned, for example: formic acid, acetic acid, propionic acid, lactic acid, maleic acid, succinic acid, tartaric acid, benzoic acid, salicylic acid, citric acid, aceturic acid, hydroxyethane-sulfonic acid and ethylene-diamine-tetraacetic acid.

The claimed compound being used as strong local anaesthetic can be administered as such or in the form of corresponding salts in aqueous solutions by subcutaneous or intramuscular injections. The dosis of a single injection in human therapy is about 1 to 3 ml. of a 1–5% aqueous solution.

In the following table some of the characteristical representatives of the compounds of the invention are listed. They are local anaesthetics with equal or stronger action than N-butylamino-2-methyl-6-chloroacetanilide which is known to be a strong local anaesthetic (cf. Arzneimittelforschung, vol. 8 (1958), page 273). In contradistinction to the latter, they have the advantage of being less toxic and to be easily water-soluble as hydrochloride as well as a base.

The hydroxy compounds (R=OH) additionally have a surface-anaesthetic action, in contradistinction to the known compound. The action of N-butylamino-2-methyl-6-chloro-acetanilide in a 1% solution was taken as 100; the new compounds were likewise applied in a 1% solution.

| Example | R | $-N{<}^{R_1-}_{R_2-}$ | Melting point, degrees | Anaesthesia | $LD_{50}$ (mouse), mg./kg. |
|---|---|---|---|---|---|
| N-butylamino-2-methyl-6-chloroacetanilide | | | | 100 | 33.1 |
| 1 | H | $-N{<}^{C_2H_5}_{C_2H_5}$ | 170 | 100 | 46.0 |
| 2 | H | $-N\langle\ \rangle$ | 106–108 | 110 | 41.1 |
| 3 | OH | $N{<}^{C_2H_5}_{C_2H_5}$ | 110–112 | 110 | 65 |
| 4 | OH | $N{<}^{C_3H_7}_{C_3H_7}$ | 118–120 | 100 | 40 |

The following examples illustrate the invention:

EXAMPLE 1

Isobornyloxycarbonyl-diethylamino-propylamide-hydrochloride (a) Chlorocarbonic acid isobornyl ester.—The solution of 28 g. of isoborneol and 25 cc. of pridine in 400 cc. of anhydrous benzene was added dropwise, while stirring, at 0° C., to the solution of 100 g. of phosgene in 350 cc. of anhydrous benzene. After having stirred for 1 hour at 20° C., the mixture was filtered with suction, the filter residue was washed thoroughly with benzene and the filtrate was washed twice with ice-cold water, dried over sodium sulfate and evaporated under reduced pressure. Yield: 39.4 g. (100%) of an oil.

(b) 32.5 g. (0.15 mole) of chlorocarbonic acid isobornyl ester were added dropwise, in the course of 1 hour, to the solution of 13 g. (0.1 mole) of aminopropyl-diethylamine in 50 cc. of dimethylformamide, while stirring and at 15°–20° C. After having stirred for 1 hour at room temperature, absolute ether was added while stirring, the mixture was decanted and trituration was effected with fresh absolute ether. After standing, the crystals were filtered off with suction, washed with absolute ether and dried under a highly reduced pressure over KOH and $P_2O_5$ Yield: 24.9 g. (72%); melting point: 170° C.

EXAMPLE 2

Isobornyloxycarbonyl-pyrrolidino-propyl-amide-hydrochloride (a) Isobornyloxycarbonyl - N - hydroxy-succinimide ester.—8.2 cc. (100 mmole) of pyridine in 65 cc. of dioxane were added dropwise, while stirring, at 0° C., to the solution of 21.67 g. (100 mmole) of chlorocarbonic acid isobornyl ester and 15.0 g. (130 mmole) of N-hydroxy-succinimide in 100 cc. of dioxane. After having stirred for 5 hours and allowed the whole to stand for 12 hours at room temperature, the whole was filtered with suction, washed with a small amount of dioxane and the filtrate was evaporated under reduced pressure. The oily residue was recrystallized from a mixture of methanol and water.

Yield: 23.78 g. (81%); melting point: 95–97° C.

(b) 12.8 g. (0.1 mole) of aminopropyl-pyrrolidine were dissolved in 125 cc. of tetrahydrofurane and combined, at 0° C., with 32.0 g. (0.11 mole) of isobornyloxycarbonyl-N-hydroxy-succinimide. After having stirred for 2 hours at room temperature, the solution was diluted with 1 liter of ether, washed with water and dried over sodium sulfate. To the filtrated solution, which had been diluted with 500 cc. of absolute ether, 27.8 cc. (0.1 mole) of 3.6 N-HCl/dioxane and 3–4 liters of absolute ether were added. Decantation was effected immediately to isolate the oil that had separated and trituration was carried out with fresh absolute ether. The crystals that had formed were filtered off with suction and washed with absolute ether.

Yield: 20.9 g. (61%); melting point: 106–108° C. (decomposition).

EXAMPLE 3

Isobornyloxycarbonyl-diethylamino-n-(2-hydroxypropyl)-amido-hydrochloride (a) 32.5 g. (0.15 mole) of chlorocarbonic acid-isobornyl ester were added dropwise, in the course of 1 hour, while stirring, at 15°–20° C., to the solution of 14.6 g. (0.1 mole) of diethylamino-3-amino-2-propanol in 50 cc. of dimethylformamide. After having stirred for 1 hour at room temperature, absolute ether was added while stirring, the whole was allowed to stand for 24 hours, decanted and triturated with fresh absolute ether. The crystals were filtered off with suction, after having been allowed to stand, washed with absolute ether and dried under a highly reduced pressure over KOH and $P_2O_5$.

Yield: 28.5 g. (79%); melting point: 105–109° C.

(b) 12.7 g. (0.035 mole) of diethylamino-3-amino-2-propanol were dissolved in 100 cc. of methylene chloride and combined, at 0° C., with 10.3 g. (0.035 mole) of isobornyloxycarbonyl - N - hydroxysuccinimide ester. After having stirred for 10 hours at room temperature, the whole was washed with water and dried over sodium sulfate. The filtered solution was neutralized, while cooling, with HCl/dioxane and combined with petroleum ether. Decantation was effected to isolate the oil that had separated which was then triturated with fresh absolute diisopropyl ether. The crystals that had formed were filtered off with suction and washed with absolute ether.

Yield: 9.5 g. (75%); melting point 110°–112° C.

EXAMPLE 4

Isobornyloxycarbonyl-di-n-propylamino-n-(2-hydroxypropyl)-amido-hydrochloride

The compound was obtained from 17.4 g. (0.10 mole) of di-n-propylamino-2-propanol and 32.5 g. (0.15 mole) of chlorocarbonic acid isobornyl ester in 50 cc. of dimethylformamide in the manner described in Example 1(b).

Yield: 23.8 g. (61%); melting point 118°–120° C. (decomposition).

We claim:

1. A basically substituted isobornyl urethane of the Formula I

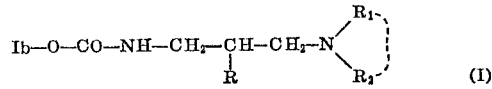

(I)

in which Ib represents the isobornyl radical, R represents hydrogen or the OH-group, $R_1$ and $R_2$ represent an alkyl radical having 1 to 4 carbon atoms or N, $R_1$, $R_2$ represent the pyrrolidino or piperidino radical and their salts with physiologically tolerated acids.

2. A compound as defined in claim 1 wherein R is OH.
3. The compound as defined in claim 1 wherein R is OH and $R_1$ and $R_2$ are both ethyl.
4. The compound as defined in claim 1 wherein R is OH and $R_1$ and $R_2$ are both n-propyl.

References Cited

UNITED STATES PATENTS 3,345,399    10/1967    Gerzon et al. _____ 260—468

HENRY R. JILES, Primary Examiner

G. T. TODD, Assistant Examiner

U.S. Cl. X.R.

260—293.56, 293.87, 326.3, 326.5 L; 424—267, 274, 311